Patented Dec. 21, 1943

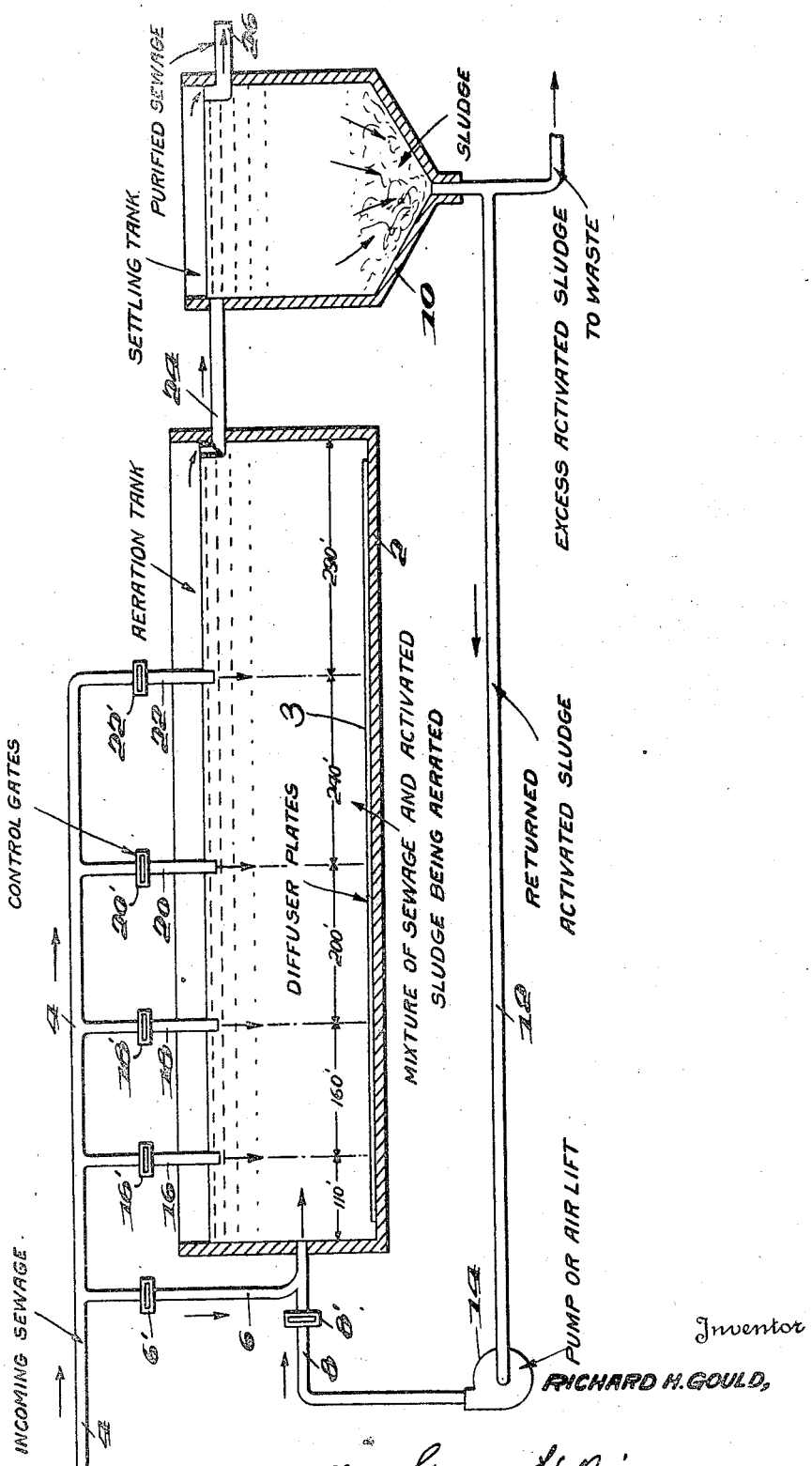

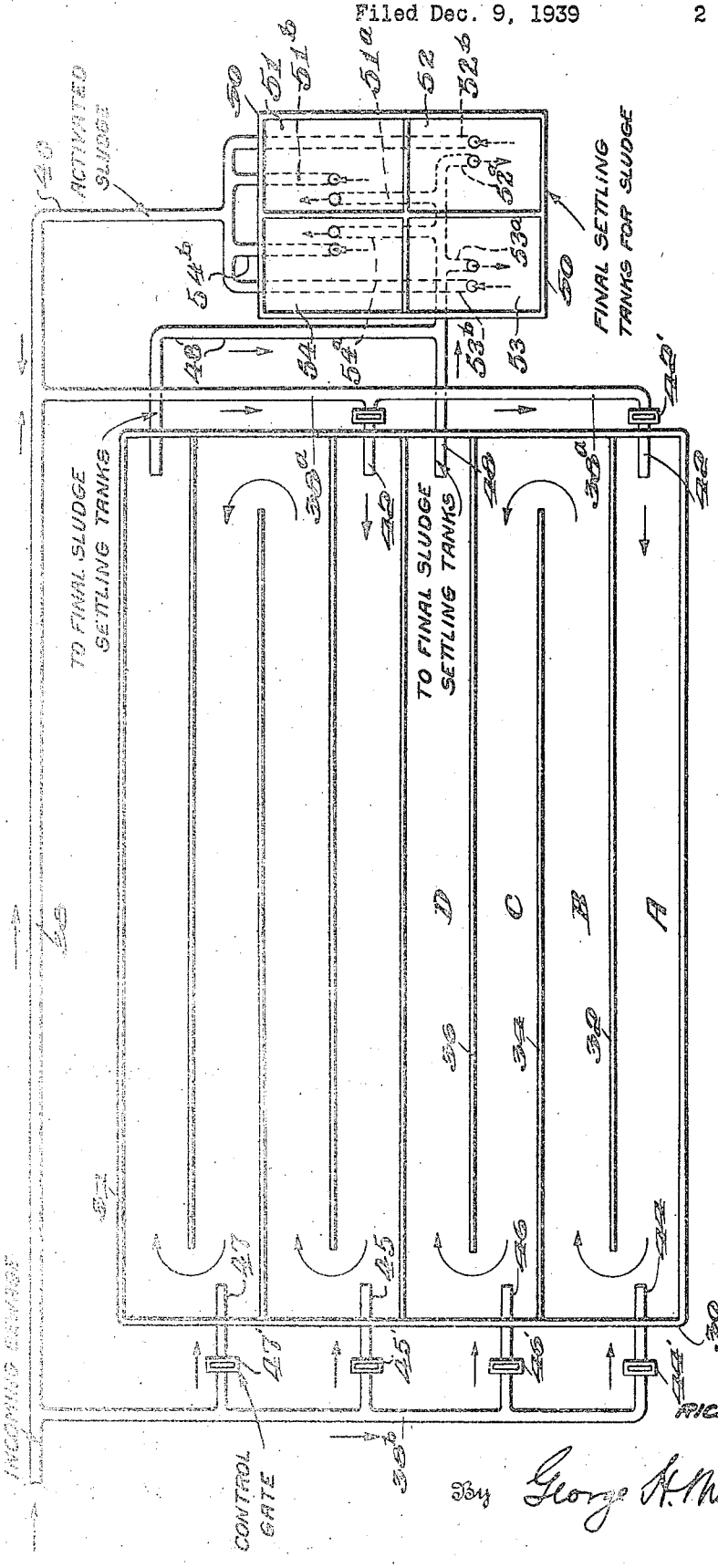

2,337,384

UNITED STATES PATENT OFFICE 2,337,384

ACTIVATED SLUDGE PROCESS OF TREATING SEWAGE AND APPARATUS THEREFOR

Richard H. Gould, Douglaston, Long Island, N. Y.

Application December 9, 1939, Serial No. 308,481

5 Claims. (Cl. 210—8)

This invention is for an improvement in the activated sludge process for purifying sewage.

In the continuous flow activated sludge process as at present practiced, all of the activated sludge and sewage to be purified enters the aeration tank at its intake end; and during its subsequent flow through the tank air is supplied continuously to the liquid mixture through bottom diffuser plates which provide the necessary aerobic conditions for the bacterial purifying action.

In such present practice, where the total amount of sewage and sludge is thus introduced at one time into the intake end of the tank, the reaction between the bacteria of the sludge and the sewage is extremely rapid, thereby creating an enormous and immediate demand for oxygen, a demand that is greater than can always be supplied by the available dissolved oxygen in the liquid in the tank at that point. The resulting impoverishment of oxygen greatly lessens the action of the aerobic bacteria, which require at all times an ample supply of dissolved oxygen for effective action.

According to my invention, only a portion of the total quantity of sewage to be treated is added to the sludge at the intake end of the aeration tank, the remainder of the sewage being added by being introduced into the tank in separate increments at a plurality of points along the path of travel through the tank of the mixture of sewage and sludge.

The system herein described therefore employs a new principle and thereby effects an improvement in the standard activated sludge process now so generally used. My improved process has given results equal to those secured by the present process, using a standard aeration tank of about one-half to two-thirds the usual capacity; moreover, the required necessary compressed air input has been found to be very materially less than that required in a normal sized plant using the prior methods of purification.

The theory underlying my new method is based on a reconsideration and new evaluation of the basic principles of activated sludge methods. It has been brought out by experiences in the past at several plants, notably at Chicago and more recently in New York city, that in the standard aeration tank as now generally used, the major purification of sewage in the tank, both in respect to clarification and B. O. D. reduction, takes place in the first few minutes of contact with activated sludge in the tank, and that thereafter further purification is slight.

In other words, it has been discovered that after the sewage has been in contact with the sludge for about thirty minutes, the suspended and colloidal matters have become attached to the sludge, so that in a standard four pass tank the final effluent is not measurably better than it is after it has passed through the first 1½ passes thereof. A very important function is performed, however, by the final 2½ passes, namely, the restoration and maintenance of the effective condition of the activated sludge to be recirculated in the system. The effectiveness of activated sludge is dependent on certain physical and biological properties. When in proper condition it has the property of attaching to itself the solids and colloidal matter in the sewage and, with this matter, also most of the bacteria present in the sewage. In order that these freshly abstracted solids may be converted into active sludge, they must be allowed to decompose to a certain stage under aerobic conditions; and to permit this they heretofore have been circulated in the system for a considerable period of time.

It is generally conceded that the qualities of activated sludge that make it effective in the purification of sewage are due to the biological life occurring in this sludge. Research has shown that when raw sewage is mixed with activated sludge, biological activity is greatly stimulated, with a consequent extremely high rate of demand on the dissolved oxygen in the mixture. This high rate of oxygen demand is of short duration and tapers off rapidly. But reestablishment of the necessary high concentration of dissolved oxygen can be only slowly effected.

In considering this problem, I realized that if too much sewage were added to the sludge, all the dissolved oxygen in the mixture might be used up, impairing the aerobic condition so necessary for the essential biological life. Since organic matter in the sewage is the food required by the biological life, I also recognized that too much food at one time, complicated by absence of a sufficiently high oxygen concentration, might be harmful to this life and, on the other hand, that too great intervals between feedings would not permit maximum development.

In my improved process, the sludge is not diluted at the start, as it is with the activated sludge processes now generally carried on, wherein all the sewage is added to the sludge at the start. With my improved process, where only a limited amount of sewage is added at the start, the concentration of the sludge is higher. Because of this higher concentration of sludge, a smaller tank, using my process, will treat the same amount of sewage in the same time and with equal efficiency than a larger tank using the old and customary activated sludge process.

According to the present invention, therefore, instead of introducing all the sewage at one time into the intake end of a tank, as has been done in the past, only a limited amount of sewage is there introduced, and consequently the sludge is not unduly diluted. Since the amount of sewage introduced is limited, the oxygen available, both dissolved and suspended, in the mixture of sludge and sewage in this portion of the tank, is sufficient for the portion of the purifying reaction which proceeds at that point. Then, according to the present invention, further doses of raw sewage are later supplied to the mixture of sludge and sewage undergoing aeration, at successive, separated points during the travel of the liquid through the tank.

This introduction of sewage into the tank at successive points and in the form of increments or divided doses achieves two very important and advantageous results.

First, the demand for oxygen by the microbes, which is developed as soon as the sewage comes into contact with the activated sludge, is distributed all along the tank, and with the result that the amount of dissolved and suspended oxygen can be constantly maintained in relatively greater concentrations, thereby enabling the aerobic bacteria to operate with greater efficiency; and the biological life involved in the activated sludge process at any one time is thereby benefited and multiplied.

Secondly, the successive feeding of the microbes in the activated sludge by adding sewage in several smaller increments rather than all at one time, is advantageous, as there is always a fresh food supply upon which the microbes may work without their becoming supplied with an amount of food beyond their powers of assimilation. This permits the microscopic life to develop at its most effective rate and the sewage as a whole is more rapidly and efficiently purified.

The capacities of the aeration tanks are such that the actual time of passage of a given initial quantity of activated sludge through the tank may be the same in the new treatment as that required in the present standard activated sludge process. But since each successive momentary decline in the concentration of activated sludge and oxygen, resulting from the divided dosage of the liquid with increments of sewage, is minimized, as opposed to the much more rapid and extensive decline of concentration caused by full sewage dosage at the entrance of the tank as in standard practice, the average concentration of sludge and oxygen is at all times higher under my new treatment, and the size of the tank for equal burden of treatment may be correspondingly less. Moreover, the addition of sewage to the sludge in smaller portions, in the form of increments, minimizes or eliminates sudden shocks to the biological life, and results in more stable and adequate concentrations of dissolved oxygen and active, efficient sludge in the aeration tank at all times.

The practice of my improved process as described results in a greater efficiency of operation, permitting more sewage to be treated per cubic foot of tank capacity than with prior processes where all the sewage was introduced at one time. For example, if a particular aeration tank will treat, say, ten million gallons of sewage per day, the same tank, if changed over to operate according to the present process, will treat at least sixteen million gallons per day.

Furthermore, in the practice of the present process, less air per gallon of sewage treatment is required, a saving which is of great importance because of the cost of supplying compressed air for aeration. I have found that, in prior practice, where 0.6 cubic foot of air per gallon of sewage is required, with my improved process less than 0.4 cubic foot of air per gallon of sewage is sufficient for producing the same degree of purification.

The intermittent dosage of activated sludge with sewage in aeration tanks permits the use of smaller aeration tank capacities in producing equivalent results in the purification of sewage and in maintaining optimum activity of the activated sludge, with resulting saving in initial constructon costs and land area; and because of the smaller required tank area a substantial reduction is also effected in the amount of power required for the aeration of the mixed sewage and activated sludge.

In carrying out my improved process, I have found that the best results will be secured by so spacing the sewage inlets that the successive times of travel of the sewage undergoing treatment, from one sewage inlet to another, are the same, in spite of the fact that the speed of flow of the sewage increases as it passes along the tank, as additional increments of sewage are supplied. In other words, the inlet pipes for supplying successive increments of sewage are spaced successively farther apart, along the line of travel of the sewage.

In order to explain the invention further, reference is made to the accompanying drawings, where Fig. 1 is a diagrammatic view illustrating one way of carrying out the process, and Fig. 2 is a diagrammatic lay-out of the main features of a sewage treatment plant embodying my invention now in actual operation.

Referring to Fig. 1 of the drawings, 2 indicates an activated sludge aeration tank of the continuous, so-called spiral flow type, provided with the usual air diffuser plates 3. Sewage from the preliminary settling tanks is supplied through the pipe 4; an initial portion of this sewage is led through a pipe 6 to the tank 2, this pipe 4 preferably joining with a feed pipe 8 which supplies a liquid suspension of activated sludge, the mixture of sewage and activated sludge being thus fed into the tank 2 at the intake end. Pipes 6 and 8 are provided with control gates 6' and 8'.

In practice, the sludge supplied by the pipe 8 is obtained and returned from a final sludge settling tank 10 through a return pipe 12 by means of a pump or air lift 14. Sewage from the pipe 4 also flows into a plurality of additional sewage supply pipes 16, 18, 20 and 22, so as to introduce sewage to the tank in successive increments and in regulated amounts at separated points in the path of travel of the liquid, the several supply pipes mentioned being supplied with control gates 16', 18', 20' and 22' for this purpose. After treatment, sewage flows from the aeration tank 2 through a suitable pipe 24 to the final settling tank 10, the purified effluent from the settling tank passing out through the pipe 26, as is customary.

The sewage inlets 16, 18, 20 and 22 are spaced so that the successive times of travel of the sewage in the tank, in passing from one inlet to the next, are substantially the same, in spite of the fact that the speed of flow of the sewage increases as it passes along the tank, as additional increments of sewage are supplied. The inlets are spaced successively farther apart; for example, in an aeration tank 1,000 feet long and of uniform cross section, such inlets are preferably spaced about as follows:

|  | Feet |
|---|---|
| From the head end of the tank to first inlet 16 | 110 |
| From the inlet 16 to inlet 18 | 160 |
| From the inlet 18 to inlet 20 | 200 |
| From the inlet 20 to inlet 22 | 240 |
| From the inlet 22 to end of the tank | 290 |

Expressed in terms of percentage of the length of the tank, the inlets may be placed about as follows:

Inlet 16—11% of the length, from the head end

Inlet 18—27% of the length, from the head end.

Inlet 20—47% of the length, from the head end.

Inlet 22—71% of the length, from the head end.

It should be understood that the above dimensions are approximate, and also that the number of sewage inlets may be increased or decreased, within the scope of the present invention.

Reference is made to Fig. 2, which illustrates diagrammatically a portion of an installation now in actual operation which embodies my invention. These tanks, as installed and successfully operated, are of the spiral flow, four-pass type, 373 feet long, with a water depth of 15 feet, each pass of the tank having a width of 22 feet, 3 inches. One of these tanks, indicated generally by 30, has three partitions 32, 34 and 36 defining four passes A, B, C, and D. The other tank 31 is a duplicate of tank 30. Each pass is provided with the usual air diffuser plates arranged on the bottom in continuous rows adjacent and parallel to one side wall thereof.

Sewage from the pipe 38 is mixed with activated sludge from the pipe 40 and the mixture supplied to the intake end of pass A, as indicated at 42. The activated sludge and sewage flow along the first pass A, and another increment of sewage is supplied at the end of pass A by the pipe 44. The mixture then travels along the passes B and C, and another increment of sewage is supplied by the pipe 46 at the end of the pass C. The mixture then travels along the pass D and out of the exit pipe 48 to the final settling tanks 50, from which the amount of activated sludge necessary for the next cycle is supplied to the pipe 40. Pipes 42, 44 and 46, which are supplied with sewage from pipe 38, are provided with suitable control gates 42', 44' and 46', for regulating the amount of sewage so supplied.

The same process takes place in the second tank 31, the mixture of sewage and sludge entering by branch pipe 42' from 38ᵃ, successive increments of raw sewage being fed in by pipes 45 and 47, controlled by valves 45' and 47', from branch 38ᵇ.

Settling tank 50 is conveniently made in four compartments 51, 52, 53 and 54. Treated sewage from tanks 30 and 31, containing the activated sludge formed in the process, is led by pipes 48 and 48' to each compartment and delivered thereto by respective branch pipes 51ᵃ, 52ᵃ, 53ᵃ and 54ᵃ. Activated sludge is drawn from the bottom of the several compartments by respective pipes 51ᵇ, 52ᵇ, 53ᵇ and 54ᵇ for delivery to the activated sludge pipe 40, this sludge mixing with raw sewage from pipe 38, the mixture being delivered to the branch pipe 38ᵃ and thence to the treating tanks 30 and 31, as described. Effluent and excess sludge are drawn off from tank 50 by conventional means, as shown in connection with tank 10, Fig. 1.

The subject matter of this invention may also be practiced in sewage treatment plants using mechanical aerators instead of diffuser plates.

While I have described my invention in some detail, it should be understood that the invention is not limited to the precise details described, but may be carried out in other ways, and with other apparatus.

I claim as my invention:

1. The improvement in the activated sludge process of treating sewage in an aerating tank of the continuous flow type having a long continuous path of flow travel for sewage, which comprises feeding activated sludge, obtained at the end of the process, to the head end of the tank and feeding a supply of sewage to the head end of said tank, feeding an additional supply of sewage to said tank at a point substantially advanced along the path of flow travel from the head end of said tank and beyond the point of maximum activity between the sludge and sewage fed to the head end of said tank, aerating the mixture of sewage and sludge while in said tank, discharging all of the mixture from said tank at the end of the path of flow travel thereof, and separating the resulting activated sludge and effluent at the end of the process.

2. The improvement in the activated sludge process of treating sewage in an aerating tank of the continuous flow type having a long continuous path of flow travel for sewage, which comprises feeding activated sludge obtained at the end of the process to the head end of the tank, feeding supplies of sewage to said tank at spaced points along the path of flow travel from the head end of said tank, each said point being beyond the point of maximum activity between the sludge and the sewage admitted at the next preceding point, aerating the mixture of sewage and sludge, discharging all of the mixture from said tank at the end of the path of flow travel thereof, and separating the resulting activated sludge and effluent at the end of the process.

3. The improvement in the activated sludge process of treating sewage in an aerating tank of the continuous flow type having a long continuous path of flow travel for sewage, which comprises feeding the entire supply of activated sludge to the head end of said tank, said sludge being obtained at the end of the process, feeding sewage to said tank at a plurality of spaced points along the path of flow travel, one of said points being at the head end of said tank, and each succeeding point being beyond the zone of maximum activity between the sludge and the sewage admitted at the next preceding point, aerating the mixture of sewage and sludge, discharging all the mixture from said tank at the end of the path of flow travel thereof, and separating the resulting activated sludge and effluent at the end of the process.

4. The improvement in the activated sludge process of treating sewage in an aerating tank of the continuous flow type having a long continuous path of flow travel for sewage, which comprises feeding activated sludge obtained at the end of the process, to the tank and feeding sewage to the tank, at least the sewage being fed to the tank at a plurality of spaced points along the path of flow travel, aerating the sludge and the sewage in said tank, discharging all the mixture of aerated sewage and sludge from said tank at the end of the path of flow travel thereof, and separating the resulting activated sludge and effluent at the end of the process.

5. In an apparatus for the treatment of sewage by the activated sludge process, an aeration tank, partition means in said tank to provide a long continuous path of flow travel through said tank, sewage and sludge inlet means at the head end of said tank, additional sewage inlet means to said tank located along said path of flow travel and removed a substantial distance from said first mentioned inlet means, areation means for sewage and sludge in said tank, and discharge weir means for sewage and sludge at the end of said path of flow travel in said tank.

RICHARD H. GOULD.